United States Patent [19]
Saraceni

[11] 4,225,808
[45] Sep. 30, 1980

[54] SELECTIVE ILLUMINATION

[75] Inventor: Remo Saraceni, Philadelphia, Pa.

[73] Assignee: Novitas, Inc., Santa Monica, Calif.

[21] Appl. No.: 912,442

[22] Filed: Jun. 5, 1978

[51] Int. Cl.² ............... H05B 37/02; F21P 3/00
[52] U.S. Cl. .................... 315/307; 250/221;
    307/116; 315/154; 315/194; 315/360; 340/541;
    362/125
[58] Field of Search .............. 315/154, 159, 194, 199,
    315/291, 307, 360, 361, 362, DIG. 4; 362/125,
    802; 250/221, 551; 307/39, 116; 340/527, 528,
    541; 328/5

[56] References Cited

U.S. PATENT DOCUMENTS

| 3,446,976 | 5/1969 | Shaw ........................... 250/551 |
| 3,459,961 | 8/1969 | Ravas .......................... 362/802 X |
| 3,500,455 | 3/1970 | Ross et al. .................... 315/154 X |
| 3,573,543 | 4/1971 | Grindstaff ..................... 315/194 |
| 3,898,383 | 8/1975 | Herbits ........................ 315/291 X |

Primary Examiner—Eugene R. LaRoche
Attorney, Agent, or Firm—Weiser, Stapler & Spivak

[57] ABSTRACT

Different portions of an area are selectively highlighted in response to observer proximity. An adjustable dimmer establishes the non-highlight illumination level for each area. The dimmer is overridden by observer-sensing circuitry to produce the highlight illumination level.

3 Claims, 4 Drawing Figures

SELECTIVE ILLUMINATION

This invention relates to a technique (including both apparatus and method aspects) for producing improved visual display effects.

In merchandising various types of goods, it has long been recognized that lighting is an important factor in the display of the goods to prospective customers. Different kinds of lighting have been found to vary widely in the effectiveness which they contribute to a favorable visual impact of these goods. Accordingly, numerous lighting techniques have evolved for merchandising display, including spotlighting, floodlighting, backlighting, even "black" lighting. However, despite the wide variety of existing choices, there were still situations in which known lighting techniques left something to be desired.

In particular, I have found this to be the case for those situations in which many different items of goods, or groupings of such items were to be displayed separately, but within a display area which is large relative to the space occupied by each individual item or grouping.

To my knowledge, there has been in vogue for such situations, essentially only one lighting treatment. This has involved primarily a high general level of illumination within the entire area. Within this general ambient lighting, there have indeed been attempts to further highlight certain portions. However, this has not been highly effective. Because of the bright general light level, highlighting would have had to be very intense to really stand out. Also, this technique would be exceedingly wasteful of electrical energy. Practical (and correspondingly more economical) levels of highlighting provided little distinctiveness and emphasis for the highlighted portions.

Other possible types of lighting, e.g. low general illumination with local highlighting of desired items through "pools" of light may have been considered from time to time, but so far as I know, did not find favor in practice. Likewise, it may be that consideration has been given to the possibility of providing low ambient illumination, and having attendants accompany the customers through the display area, turning on localized highlighting as they went. Again, however, this would scarcely be a practical arrangement.

All of the various possibilities contemplated above suffered from what I believe to be serious deficiencies in customer effectiveness. For example, the one with a high general lighting level plus very diverse supplemental highlighting creates too bright an overall environment, and also tends to be glary. Permanent highlighting at lower levels produced a rather "black", or non-dramatic appearance. Other possibilities, likewise suffered from various predictable merchandising shortcomings.

Turning now to a different, but interrelated matter, there is the problem of rapidly rising energy costs. This has placed a premium on measures which will conserve energy, while not adversely affecting other desirable objectives. In the field of display lighting of the type discussed above, the need to conserve energy has to my knowledge also not been satisfactorily met. For example, so-called "dummy bulbs" have been installed in multi-bulb lighting fixtures, but this simply lowers the over-all level of illumination, which is esthetically unwanted.

It should also be noted that the problems addressed above are not strictly limited to display lighting situations. They can also arise in other situations as more fully discussed later in this specification.

Accordingly, it is an object of the present invention to provide an improved technique for utilizing lighting effects in merchandising and other applications.

It is another object to provide such an improved technique which is particularly suitable for large display areas, in different portions of which individual items or groups of items are located.

It is still another object to provide such an improved technique which highlights selected portions of the over-all display area.

It is still another object to provide such a technique which accomplishes the highlighting in a manner particularly effective from the merchandising standpoint.

It is still another object to provide such a technique which is particularly efficient in electrical energy consumption.

It is still another object to provide such a technique which effectively attracts the attention of a passerby.

It is still another object to provide such a technique which is efficient not only with respect to the energy consumed by the lighting itself but also with respect to other energy needs of the premises.

These and other objects which will appear are achieved in accordance with the present invention as follows:

The different portions of a display area which are to be separately highlighted are each provided with their own lighting fixture, or set of fixtures, positioned and arranged to produce the desired localized highlighting effect when operating at relatively high levels of light intensity. Each area is further provided with its own instrumentality for sensing the presence within that area (or at least in the vicinity of the goods on display in the area) of a prospective customer. The sensing instrumentality so controls the lighting fixture or fixtures for the same area that these operate at a relatively low level of light intensity when no customer is being sensed. On the other hand, they switch to a relatively high level when a customer is sensed by the sensing instrumentality.

Preferably, control of the transition between low and high intensity is achieved by means of a light source, actuated by the sensing instrumentality and interacting with a photosensitive device which, in turn, controls the brightness of the actual lighting.

Timing means are provided for controllably delaying the return of the light level to its low intensity, after the customer's presence is no longer being sensed.

This technique ingeniously achieves a blend of many desirable characteristics. Individual portions of the display area are selectively highlighted automatically, as a prospective customer comes into their vicinity. This produces a desirable effect in several aspects. The particular goods on display in the individual portion of the area are dramatized by the highlighting. Attention is drawn to merchandise which might have gone unnoticed if the lighting had remained constant.

Distinctiveness of lighting treatment can be enhanced for each individually highlighted portion of the display area. Altogether a tremendous amount of flexibility is provided by the inventive technique, leading to vast potential improvements in effectiveness from the marketing standpoint.

Moreover, the technique is very economical in usage of electrical power, since only a selected portion of the display area is subjected to relatively intense illumination at any given time. Other portions are maintained at a low level. This in itself, saves very substantial quantities of energy. The energy savings is further greatly enhanced by the fact that this technique also reduces the heat load which the lighting system imposes on the premises, saving greatly on air conditioning expenses, and that it reduces lighting fixture maintenance costs, both as to replacement parts and labor. Analysis has shown that the savings resulting from all these causes can readily amount to thirty percent or more.

For further details, reference is made to the discussion which follows taken in light of the accompanying drawings wherein FIG. 1 is an over-all view (in perspective) of a portion of a merchandise display area utilizing the inventive technique;

The same reference numerals are used in the figures to denote similar elements.

Figure 1:
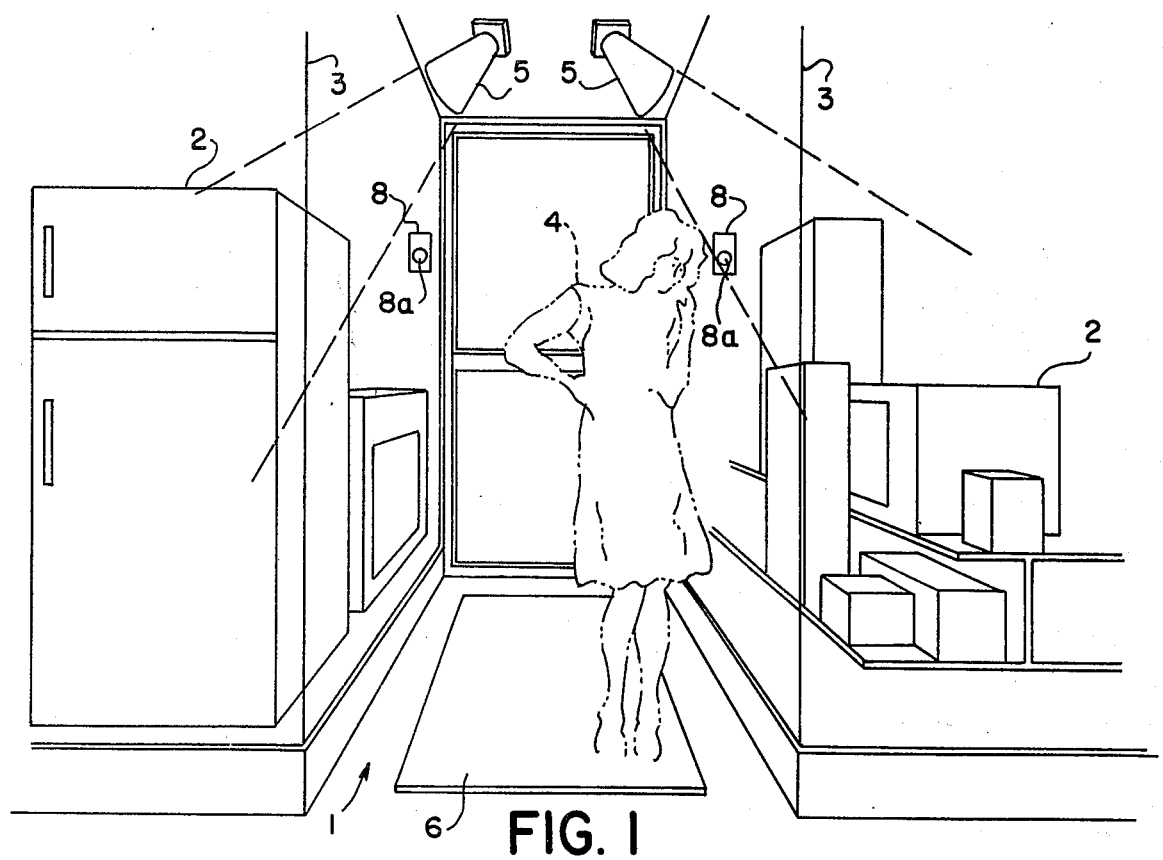

Referring to FIG. 1, this shows a passageway 1 defined between a grouping of goods 2 disposed on both sides of the passageway 1. As shown in FIG. 1, the groupings of goods are enclosed in glass showcases 3. However, this is not essential insofar as the present invention is concerned, nor is the specific positioning of the groupings on opposite sides of the passageway. What is essential is that there is the opportunity for a prospective customer such as illustrated in phantom at 4 in FIG. 1, to be able to approach the goods in a proximity such as is conventional in display areas.

Lighting fixtures 5 are provided, positioned so as to provide the desired localized highlighting of groupings 2 when the fixtures 5 are operating at an intense light level. On the other hand, when these fixtures 5 are operating at a substantially lower lighting level, they provide only comparatively dim, and non-highlighting illumination for the groupings 2.

A floor mat 6 is provided in the passageway 1, so positioned that prospective customer 4 will virtually inevitably stand on this mat while in passageway 1. The mat 6 may be of any conventional construction capable of providing a switching action depending on whether a customer is or is not standing upon it. For example, the mat 6 may be provided with internal air passages, so interconnected that the customer might cause an increased pressure to manifest itself at an air outlet from the mat. This pressure increase is then relieved when the customer steps off the mat.

There is also provided a controller 7 (see FIG. 2), and one or more dimmer units 8, which are coupled both to mat 6 and to lighting fixtures 5. The controller 7, the operation of which will be more fully described below, centrally reglates the operation of the switching system 9 illustrated in FIG. 2, and may be placed at any convenient location. The dimmer unit 8 may, for example, have the general external configuration of a conventional electric dimmer switch, including a knob 8a, which is both rotatable and provides a positive off setting, such as by in-and-out reciprocation. For convenience, the dimmer unit 8 is preferably placed in a readily accessible position to permit its easy adjustment, although such placement is not necessary for operation.

The functioning and interaction between these elements in accordance with the present invention is as follows:

Upon sensing the presence of a customer 4, circuitry contained in the dimmer unit 8 switches the lighting fixtures 5 to full intensity permitting proper viewing of the viewing areas or show cases 3. After the customer 4 has viewed a display and has left the area, the switching device controlled by the floor mat 6 is deactivated.

Deactivation of the switching device subsequently causes the lighting fixtures 5 to be returned to their original, dimly lit, state, however this is preferably accomplished only after a delay period which is regulated by the controller 7. After the preselected delay period has passed, the controller 7 causes the dimmer unit 8 to return the lights to their original low level. This delay period has been found advantageous to permit a customer 4 to leave the viewing area or show cases 3 before the lighting is lowered.

Figure 2:
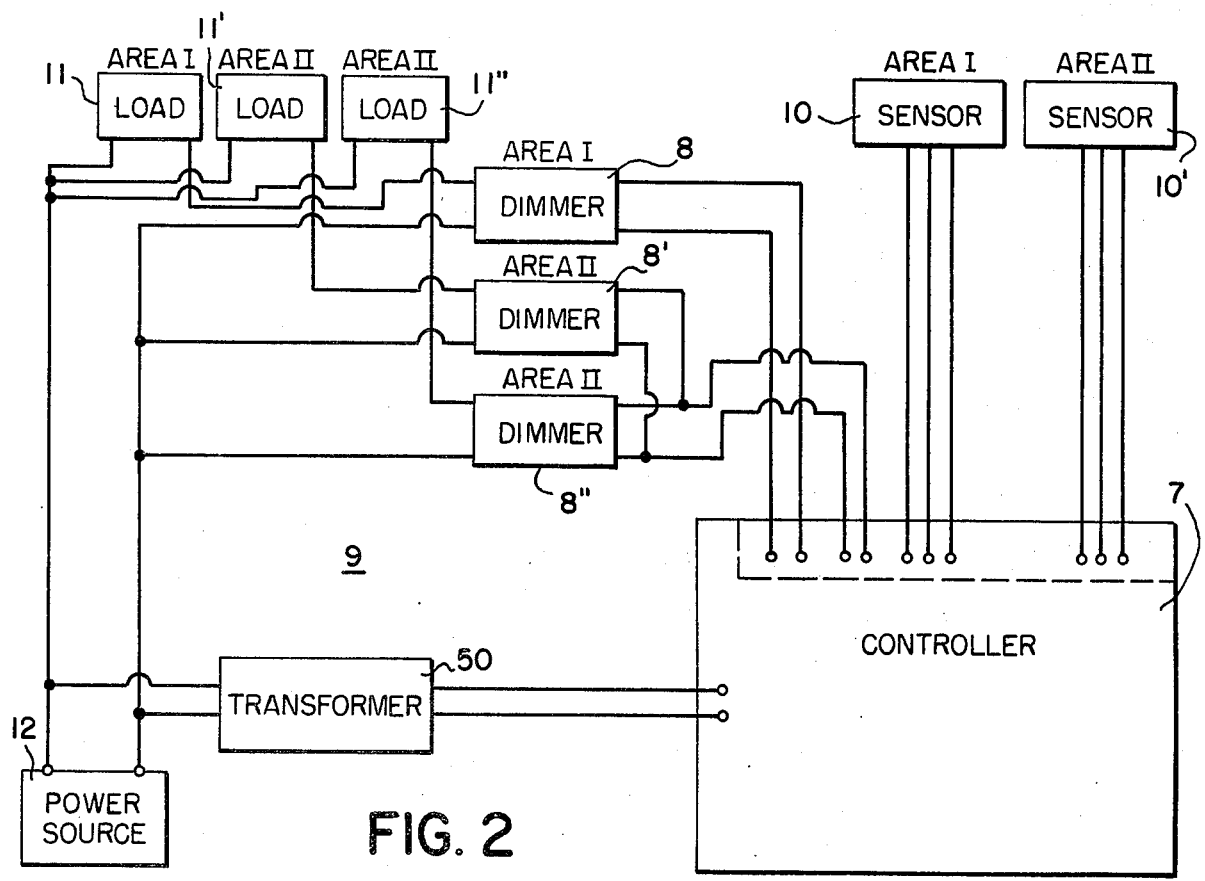
FIG. 2 is a block diagram of circuitry which is capable of performing the inventive technique.

FIG. 2 shows a block diagram of a switching system 9 which is capable of producing the above described inventive technique. The switching system 9 comprises a controller 7, one or more dimmer units 8, one or more sensors 10 such as the floor mat 6 above described, and one or more loads 11 such as the lighting fixtures 5 previously mentioned.

It will be noted that the components illustrated in FIG. 2 have been labeled as Area I and Area II components. These two groups of components serve to illustrate two variations in lighting technique which may be used in connection with the switching system 9.

A first lighting technique is illustrated in connection with a first viewing area, Area I, in which a single dimmer unit 8 controls a single load 11. The load 11 may comprise either one or several lighting fixtures 5 as desired. As an example, in a viewing area such as that illustrated in FIG. 1, the lighting provided to each showcase 3 by the fixtures 5 would be uniformly controlled by a single dimmer unit 8 (either of the two dimmer units 8 shown being suitable).

In general, each such viewing area is provided with a load 11, which is placed in series with a dimmer unit 8 and a power source 12, which would generally be a standard household voltage alternating current source. The dimmer unit 8 for each viewing area is also connected to one portion of the controller 7, thus permitting central co-ordination of the lighting system 9.

The dimmer unit 8 contains circuitry which is capable of maintaining the current delivered to the load 11 at a preselected low level until such time as the presence of a customer 4 is sensed. At that time, upon a signal from the controller 7, the circuitry contained within the dimmer unit 8 is then capable of delivering a maximum current to the load 11. The controller 7 is responsive to a signal from the sensor 10, located within the viewing area, which is capable of sensing the presence or absence of a person in the viewing area. The sensor 10 may be any standard sensing means such as a pressure sensitive switch, an ultrasonic motion sensor, a microwave sensor, a photoelectric sensor or an audible sound sensor.

This maximum current is delivered to the load 11 until such time as the controller 7 provides a signal to the dimmer unit 8 capable of returning the circuitry contained within the dimmer unit 8 to its original, low output state. This signal is produced as follows:

The sensor 10 for the viewing area in question, upon determining that a customer 4 has left the viewing area, will change state. This change in state depends upon the type of sensor used. However, in general such a change in state would be equivalent to that of a switch, open representing an "off" state, closed representing an "on" state. Other signals capable of operating the controller 7 are also possible. The change in state of the sensor 10 signals the controller 7 that a customer 4 no longer is found in the viewing area. In order to allow the customer 4 to leave a well-lit area, for safety and convenience, the circuitry within the controller 7 maintains the output current to the load 11 at its high level for a predetermined time. This period of time is advantageously regulated by a timing circuit 13 located within the controller 7. Upon expiration of this preselected time period, the controller 7 provides a signal to the dimmer unit 8 which returns the current output to the load 11 to its original, low state.

The above series of steps is repeated as new customers enter and leave the viewing area.

The controller 7 is capable of providing a similar switching function to a plurality of areas, each being provided with its own load 11, dimmer unit 8 and sensor 10, and each receiving an individual signal from the controller 7 as customers enter and leave the respective display areas.

By providing each section of the controller 7 with its own timing circuit 13, it is possible to vary both the lighting differential provided to a given display area as well as the period of time that full current is provided to the load 11.

A second lighting technique which may be produced by the lighting system 9 is illustrated by referring to those components of FIG. 2 designated as Area II components. This technique would be useful in providing lighting of varied intensity to different locations within a viewing area. For example, in a viewing area such as that illustrated in FIG. 1, each showcase 3 could be provided with a separate dimmer unit 8, each dimmer unit 8 being capable of controlling one of the lighting fixtures 5 illustrated.

Referring now to FIG. 2, there is provided a separate dimmer unit, 8', 8" and load 11', 11" for each showcase 3. These, in turn, are controlled in unison by the controller 7, and the sensor 10' associated with that viewing area. Operation of such a system is essentially similar to that previously described, the controller 7 providing signals to the pair of dimmer units 8', 8" which in turn regulate the current delivered to the loads 11', 11". However, in this configuration one load 11' is regulated by one of the dimmer units 8' and the other load 11" is regulated by the other dimmer unit 8". In this manner the low light level produced in each showcase 3 may be separately regulated, as desired. However, the interaction of these components with the presence of a customer 4 is synchronized by the controller 7 and sensor 10'. Thus, the low levels of lighting may be individually regulated, and the high levels of lighting may be uniformly produced according to the presence or absence of a customer in the viewing area.

Other combinations are possible for use in connection with this technique. For example, several separately controlled fixtures 5 may be provided as part of a single showcase 3, each highlighting a different segment of that showcase 3. Such an effect may advantageously be used in connection with colored light bulbs, or for the production of other special lighting effects. The number of individual fixtures 5 provided as part of the lighting system 9 is limited only by the practicalities of design, the controller 7 being adapted to handle a plurality of such fixtures 5 in a wide variety of combinations.

The foregoing illustrates a switching system 9 capable of producing the inventive lighting technique previously described. The circuitry contained within the individual components above described will now be discussed in greater detail.

Figure 3:
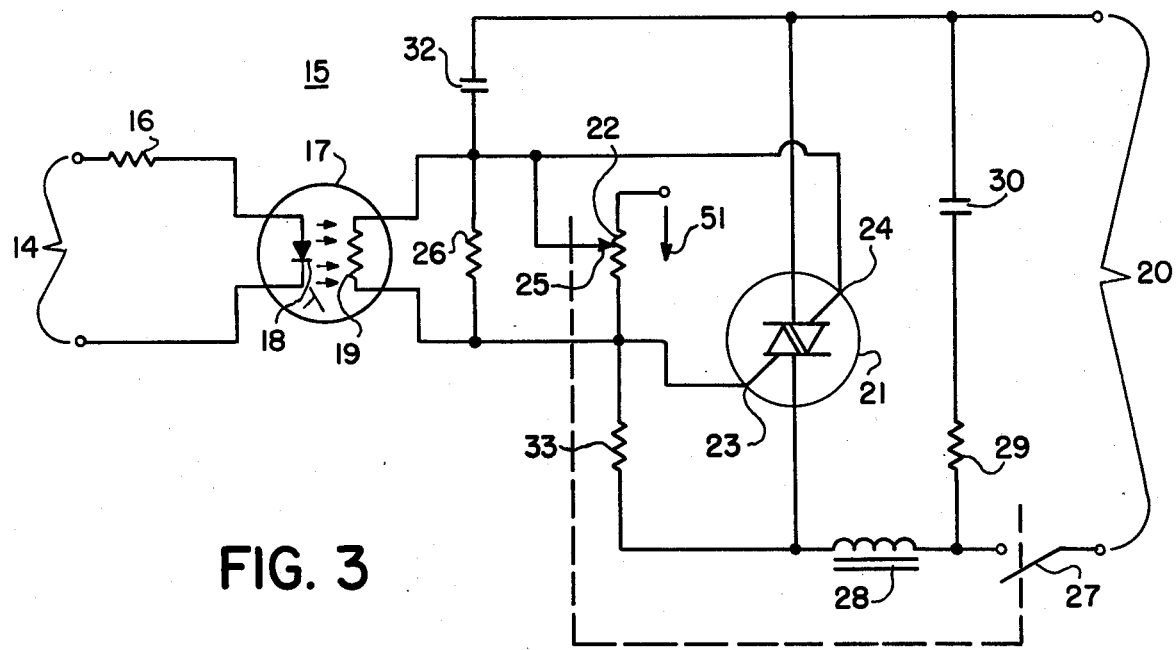
FIG. 3 is a schematic diagram of a dimmer circuit used as part of the circuitry illustrated in FIG. 2.

FIG. 3 illustrates the circuitry contained within the dimmer unit 8. The various signals produced by the controller 7, in order to regulate the current provided to the load 11 are impressed across the input 14 of the dimmer circuit 15. Various signals may be used to produce the effect sought. However, as will be shown later in the discussion describing the circuitry of the controller 7, I have selected a variable DC voltage as the signaling means. Such a signal would preferably exhibit a low voltage, near ground potential, when low currents are to be delivered to the load 11, and a relatively higher voltage, of some preselected value, when maximum currents are to be delivered to the load 11.

Upon sensing the presence of a customer 4 in the viewing area, the controller 7 would provide a high voltage level to the input 14 of the dimmer circuit 15. This voltage gives rise to an increased current through the resistor 16.

Placed in series with the input 14 and resistor 16 is the input of an optocoupler 17. The optocoupler 17 comprises a light emitting diode 18, at its input, and a photoelectric cell 19, at its output, both components being encased in an enclosure which is sealed from external light. In this manner transmission of a signal from the input to the output of the optocoupler 17 is made responsive to variations in light.

The increased current passing through the resistor 16 also passes through the light emitting diode 18 thereby illuminating the light emitting diode 18. This in turn causes the photoelectric cell 19 to change state, from a high resistance, to a low resistance.

Prior to this change in state the photoelectric cell 19 exhibits a relatively high resistance, on the order of 10 to 20 megohms. Accordingly, it has no effect on the output 20 of the dimmer circuit 15. Rather, the output 20 is essentially controlled by a semiconductor device, such as the triac 21 illustrated, and a triggering network connected between the gate inputs 23, 24 of the triac 21. A first gate input 23 is connected to one end of the variable resistor 22, and a second gate input 24 is connected to the wiper 25 of the variable resistor 22. The remaining end of the variable resistor 22 is left open. The gate inputs 23, 24 are then connected across the output 20 by a resistor 31 and capacitor 32. The capacitor 32 and the resistance exhibited by the resistor 31 and the variable resistor 22 cause the triac 21 to operate in a manner which is proportional to the resulting RC time constant. By varying the resistance across the gate inputs 23, 24, the point at which the triac 21 will change state from its normal, non-conducting, to a conducting state, may be varied. In this manner the sinusoidal current supplied to the load 11 may be chopped, and correspondingly varied. In the configuration illustrated, the output current will increase as the wiper 25 is moved in the direction of the arrow 51 shown.

A resistor 26 is provided in parallel with the variable resistor 22 to limit the lowest amount of current which may be supplied at the output 20, thus assuring that at least some light is provided when the circuit is in use.

A switch 27 is provided to enable the lighting fixture 5, to which the dimmer unit 8 is connected, to be switched off when desired.

A conventional dimmer-type control may be used as the switch 27 and the variable resistor 22. As illustrated in FIG. 2 at 52, such a dimmer-type control ordinarily has a switching member, which may be used as the switch 27, ganged with a resistive member, which may be used as the variable resistor 22. In this manner the switch 27 would be operated by reciprocating the knob 8a of the dimmer-type switch in and out, and the variable resistor 22 would be operated by rotating the knob 8a as desired. The remainder of the control circuit 15 may advantageously be placed into the housing of the dimmer control, permitting a convenient method of mounting the lighting system 9 to the existing physical structure in the viewing area.

An inductor 28 is provided, in series with the output 20, for the suppression of RF interference. The resistor 29 and capacitor 30 are provided, in series, across the output 20, to protect the dimmer circuit 15 from transients potentially exhibited by the lighting system 9.

When the photoelectric cell 19 changes state, exhibiting a low resistance on the order of 1000 ohms, the dimmer circuit 15 then is capable of providing maximum current to the load 11. The resistor 26 and variable resistor 22 are of a value such that the placement of approximately 1000 ohms in parallel therewith essentially places a short circuit across those components. Operation of the triac 21 is therefore controlled by a relatively short time constant proportional to the values of the resistor 31 and capacitor 32, thereby causing maximum current to be delivered to the load 11.

This high output current continues until such time as the input 14 to the dimmer circuit 15 is returned to its original, low state, causing the optocoupler 17 to return to its original state. Thus a high resistance is re-introduced across the gate inputs 23, 24 returning the triac 21 to its original, preset, output level.

In the above manner, a switching DC voltage level is capable of changing the current supplied to a load 11 from a low level, capable of being selected by varying a resistance, to a level of full intensity, and then back again, in response to the changes in the DC level.

Figure 4:
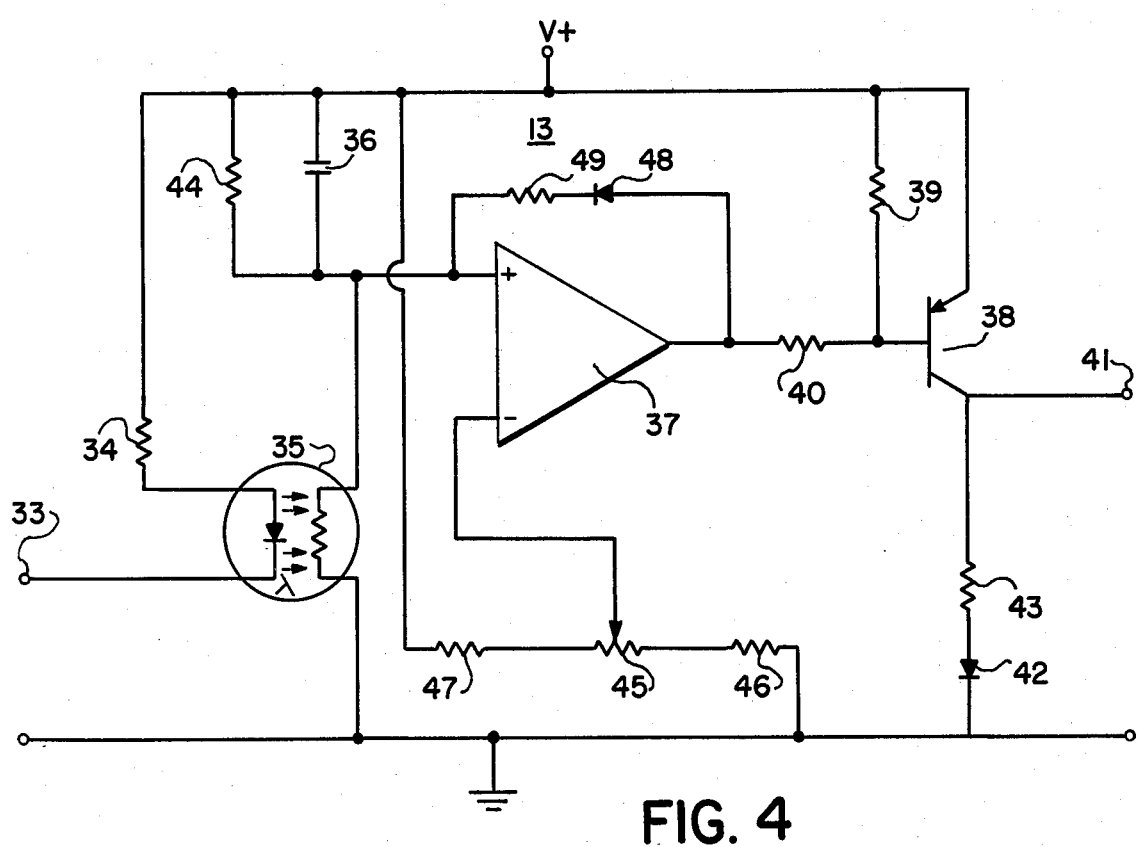
FIG. 4 is a schematic diagram of a timing circuit used as part of the controller which is part of the circuitry illustrated in FIG. 2.

In FIG. 4 there is shown a timing circuit 13 which is part of the controller 7. As illustrated in FIG. 2, the controller 7 receives a variable signal from a sensor 10 in response to the presence or absence of a customer 4 in a particular viewing area. This variable signal is introduced at the input 33 of the timing circuit 13.

Such a variable signal may be produced, for example, by selecting a sensor 10 which simulates a switch capable of sensing the presence of a customer 4 in the viewing area. When a customer is present in the viewing area the switch would close, representing an "on" state. When the customer 4 leaves the viewing area the switch would open, representing an "off" state.

In the "off" state the input 33 is an open circuit. Therefore no current is permitted to flow through the resistor 34. Switching the input to the "on" state causes a current to flow through the resistor 34, and consequently the input of the optocoupler 35.

The optocoupler 35 operates in the manner previously described, current at the input of the optocoupler 35 producing a low resistance across its output. This low output resistance permits a current to flow through the capacitor 36 to ground, thereby charging the capacitor to full potential between V+ and ground. The voltage exhibited at the non-inverting input of the op-amp, which serves as a comparator 37, is switched from its full positive value, to a value near ground potential. This causes the output of the comparator 37 to follow the input, essentially reaching ground potential.

The output of the comparator 37 is connected to the base of a transistor 38, the base current being regulated by the biasing resistor 39, 40. By bringing the base of the transistor 38 to a point near ground potential, a current is provided to the base through the resistor 39. This switches the transistor 38 "on", causing it to exhibit a low emitter-collector resistance. Accordingly, a high voltage level is exhibited at the output 41 of the timing circuit 13.

This high output voltage is then used as a signal for the dimmer circuit 15, as previously described, which in turn switches the current supplied to the load 11 to its maximum value. The high voltage exhibited at the output 41 may also be used to signal to a user the status of the timing circuit 13. To this end a light emitting diode 42 is connected from the output 41 to ground, a resistor 43 being placed in series therewith to limit the current passing through, and thereby protect, the light emitting diode 42. For high outputs the light emitting diode 42 would illuminate; for low outputs it would remain off.

The above condition would remain in effect until the customer 4 leaves the viewing area. At that time the input 33 to the timing circuit 13 would return to its open circuit condition, preventing current from flowing into the input of the optocoupler 35. As a result, the output of the optocoupler 35 would exhibit a high impedance, essentially creating an open circuit between the non-inverting input of the comparator 37 and ground.

Initially, the capacitor 36 retains its charge and the output 41 of the timing circuit 13 remains unchanged. However, the capacitor 36 is then discharged through the resistor 44, which, according to the resulting RC time constant, causes the voltage exhibited at the non-inverting input of the comparator 37 to increase at a known rate. The inverting input to the comparator 37 is provided with a reference voltage which may be regulated by the variable resistor 45 and the voltage dividing resistors 46, 47.

The output of the comparator 37 will remain near ground potential until such time as the voltage at the non-inverting input of the comparator 37 equals that at the inverting input. At that point the output of the comparator 37 will switch from essential ground to a high voltage level.

This will raise the voltage level at the base of the transistor 38 to a high level thereby preventing current from flowing through the resistor 39 to the base. This turns the transistor 38 "off", causing it to exhibit a high emitter-collector resistance. The output 41 is consequently switched essentially to ground, thus providing a low signal to the input 14 of the dimmer circuit 15, which in turn causes a low current to be delivered to the load 11, and also switching off the light emitting diode 42.

The diode 48 is provided to maintain the non-inverting input of the comparator 37 at its high level when the output of the comparator 37 changes to its high voltage level. The resistor 49 is provided as a feedback path for proper operation of the comparator 37.

Thus the output 41 of the timing circuit 13 changes state at a point which is delayed in time from a change in state at the input 33 of the timing circuit 13, and this time delay may be varied according to the resistance of the variable resistor 45. This delay period is essentially regulated by the time constant determined by the values of the resistor 44 and capacitor 36. For example, using a capacitor 36 having a capacitance of 68 microfarads and a resistor 44 having a resistance of 4.7 megohms provides a time delay capable of variation between approximately 30 seconds and 15 minutes.

The above function is repeatable according to the presence or absence of a customer 4 in the viewing area.

As illustrated in FIG. 2, the output 41 of the timing circuit 13 is connected to the input 14 of the dimmer circuit 15. In this manner the controller 7 is able to regulate operation of the loads 11.

The maximum positive value of the voltage provided by the timing circuit 13 is derived from the source voltage. This is accomplished using the transformer 50 which steps down the AC power source 12 to a lower level, for rectification and use in connection with the controller 7.

Generally, the controller 7 would have a plurality of timing circuits 13, each being capable of individual regulation. In such case it is often advantageous in the interest of space and cost, to use integrated circuitry, particularly for the op-amp used to form the comparator 37. A particularly suitable integrated circuit for this purpose would be a dual op-amp, such as that marketed by Motorola under the serial number "MC 1458". In this manner two timing circuits 13 may be appropriately grouped to utilize each of the op-amps so provided.

Being provided with a variable current, the load 11 may be adapted to perform several functions. As a lighting fixture 5, the load 11 can be switched from a low intensity light to a full intensity light to provide the display effect desired, in addition to giving rise to a substantial energy saving potential. The load 11 may also be a counter, useful in determining the interest in a given display, which would be suitably adapted to advance each time the higher current output is detected. Load 11 may also be an alarm type of device which could similarly sense a presence either to warn of an intruder or to inform sales personnel of the presence of a customer. In fact, the very act of switching the illumination from a low to a high level in itself already gives an indication of the presence of a customer.

From the foregoing, it can be seen that this invention serves well to achieve the objects earlier set forth together with other advantages which are obvious from the above discussion. It is to be understood that this invention may find other possible uses. For example, in a building such as a multistory apartment building, it may serve to selectively illuminate those portions of the hallways, stairwells and other public areas which are occupied at any given time.

As is well known, in some foreign countries it is customary to provide such public areas with timed switches which have to be pressed in order to provide illumination for a given period of time. Unless the person reaches the destination in that time interval, the process has to be repeated, and this can be awkward and even dangerous if the lights go out when the user is not near a switch.

The present invention overcomes this problem. First, the presence of someone in the hallway is automatically sensed, ending the need for that person to find the switch in order to obtain a lighted environment in which to proceed. Second, the lights are maintained at a high level of illumination until after that person has left the area, not according to a fixed time period. Thus, a person may proceed in a safe and orderly fashion, at their own pace, to their destination, not being limited by the fixed time period previously used, which often did not account for those who must proceed at a slower pace for various reasons.

The capability of the invention to cause illumination to essentially "follow" persons around a space also makes possible still other important applications.

Specifically, in the many instances in which cleaning crews move at night progressively through an otherwise unoccupied office building, the invention can be used to sense the presence of such a crew in specific rooms or areas of the building, and to illuminate those areas while leaving all other areas unilluminated.

If a guard patrols such a building at night, the invention again can be used to "follow" the guard's rounds with illumination. Yet, there is no need to rely on the guard to personally turn off the illumination after leaving each consecutive area.

The great advantage of such applications, particularly from the energy savings standpoint, is believed to be quite apparent.

In addition, if used to selectively illuminate different areas of a large space, such as the sales floor of a department store, it would serve to alert personnel leaving that someone, possibly an intruder, is still present, and would even narrow down the intruder's location to a particular one of the selectively illuminated areas.

What is claimed is:

1. A method for illuminating items separated into at least one display group located in a display area comprising:
   lighting the display area using dim background lighting;
   sensing the approach of a person to said one display group;
   switching automatically the lighting from the dim background level initially provided to a level of greater intensity upon the sensing;
   sensing the departure of the person from the said one display group; and
   returning automatically the lighting to its original dim background level upon the sensing of the departure,
   whereby a display group may be highlighted with intense lighting when a person desirous of viewing the display is present and the display group may be maintained in a dimly lit manner when no person is present.

2. The method of claim 1 wherein a series of display areas may be lighted or dimmed seriatim corresponding to the sensing of movement of persons in the display area.

3. The method of claim 1 wherein the returning of the lighting of its original background level is delayed after the sensing of departure.

* * * * *